(12) United States Patent
Gagnon

(10) Patent No.: US 8,304,736 B2
(45) Date of Patent: Nov. 6, 2012

(54) ENCLOSURE FOR HYGROSCOPIC SCINTILLATION CRYSTAL FOR NUCLEAR IMAGING

(75) Inventor: Daniel Gagnon, Twinsburg, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 6 days.

(21) Appl. No.: 13/120,659

(22) PCT Filed: Oct. 5, 2009

(86) PCT No.: PCT/IB2009/054351
§ 371 (c)(1),
(2), (4) Date: Mar. 24, 2011

(87) PCT Pub. No.: WO2010/041191
PCT Pub. Date: Apr. 15, 2010

(65) Prior Publication Data
US 2011/0174980 A1    Jul. 21, 2011

Related U.S. Application Data

(60) Provisional application No. 61/103,319, filed on Oct. 7, 2008.

(51) Int. Cl.
*G01T 1/10* (2006.01)
(52) U.S. Cl. ........................................... 250/362
(58) Field of Classification Search .................. 250/362
See application file for complete search history.

(56) References Cited

U.S. PATENT DOCUMENTS

| | | | |
|---|---|---|---|
| 5,179,284 A | 1/1993 | Kingsley et al. | |
| 7,671,340 B2* | 3/2010 | Uribe et al. | 250/363.1 |
| 2008/0149852 A1 | 6/2008 | Shoji et al. | |
| 2008/0203309 A1* | 8/2008 | Frach et al. | 250/362 |
| 2009/0257633 A1* | 10/2009 | Cook | 382/131 |

OTHER PUBLICATIONS

Herbert et al., "First results of scintillator readout with silicon photomultiplier," 2004, IEEE Nuclear Science Symposium Conference Record, vol. 7, pp. 4185-4189.*
Mirzoyan, R., et al.; SiPM and ADD as advanced detectors for astroparticle physics; 2007; Nuclear Instruments and Methods in Physics Research; A:572:493-494.

* cited by examiner

*Primary Examiner* — Kiho Kim

(57) ABSTRACT

When employing hygroscopic scintillation crystals (32) in a nuclear detector (e.g., PET or SPECT), Silicon photo-multiplier (SiPM) sensors (34) are coupled to each scintillation crystal (32) to improve scintillation event detection and reduce scatter. The crystals (32) and sensors (34) are hermetically sealed in a detector housing (50) using a sealant layer (51). Electrical contacts (60) from each sensor (34) extend through the sealant layer (51) or are bused together such that the bus extends through the sealant layer (51). In this manner, hygroscopic scintillation crystals (e.g., LaBr, NaI, etc.) are protected from humidity and light scatter is reduced by direct coupling of the sensors (34) and crystals (32).

27 Claims, 2 Drawing Sheets

ENCLOSURE FOR HYGROSCOPIC SCINTILLATION CRYSTAL FOR NUCLEAR IMAGING

CROSS REFERENCE TO RELATED APPLICATIONS

This application claims the benefit of U.S. provisional application Ser. No. 61/103,319 filed Oct. 7, 2008, which is incorporated herein by reference.

The present innovation finds particular application in nuclear imaging systems, particularly involving hygroscopic scintillation crystals and the like. However, it will be appreciated that the described technique may also find application in other imaging systems, other scintillation event detection techniques, and the like.

Scintillation crystals have a variety of properties such as density, amount of light, relaxation time, color, etc., that determine the quality of a nuclear detector. Electronics, signal processing, and reconstruction also contribute to the detector's quality, but the conversion of gamma rays to visible light through a scintillation material is often the limiting factor. In PET imaging, where timing is one of the primary characteristics of the crystal, large efforts have been expended over time to find fast-response crystal materials with high stopping power to convert gamma rays to light rays.

Finding all of the desired properties in a single crystal material has proven challenging. For instance, Lutetium-based compounds generally exhibit good timing capabilities between 35 to 45 nanoseconds decay time depending on the actual compound, with good light output and good stopping power. Lanthanum halides offer significantly faster response times and more light but suffer a lower density and lower Z-value (e.g., atomic number), resulting in a noticeably lower stopping power.

An additional problem of some crystals (LaBr, NaI, for instance) is their hygroscopic nature, which makes them sensitive to humidity and a risk of complete destruction of the scintillation properties of the crystal. Attempts to encapsulate hygroscopic crystals have involved placing the crystals in a hermetically sealed box with glass on one side, with large photomultiplier tubes that detect rays traversing the glass. The presence of a glass between the scintillator and the light sensor has the effect of spreading the light to a large area, making the signal density too low for some smaller sized light sensors, such as a solid-state avalanche photo-diode, that, with a typical 2×2 mm to 4×4 mm in size, does not collect enough light to form a good signal.

Another problem of lighter crystals such as LaBr is that while they have good light output and fast response, the low density and low Z of the crystal cause a decrease in the probability of interaction with the crystal, and when an interaction does occur, such crystals increase the chance that the interaction is Compton (scattering) and deposit only a fraction of its energy, as opposed to photoelectric interactions where all of the photon energy is converted to light.

The present application provides new and improved systems and methods for employing small sensors in a 1:1 ratio with hygroscopic scintillation crystals, which overcome the above-referenced problems and others.

In accordance with one aspect, a nuclear detector for a nuclear imaging system includes a hermetically sealable detector housing (50), a plurality of scintillation crystals (32) positioned in the detector housing (50), a plurality of sensors (34), coupled to the scintillation crystals (32), and a sealant layer (51) that hermetically seals the scintillation crystals (32) and sensors (34) in the detector housing (50).

According to another aspect, a method of constructing a nuclear detector for a nuclear scanner includes positioning a plurality of scintillation crystals (32) in a detector housing (50), coupling sensors (34) to the scintillation crystals (32), and hermetically sealing the scintillation crystals (32) and sensors (34) in the detector housing (50) using a sealant layer (51).

In accordance with another aspect, a nuclear scanner (12), preferably a positron emission tomography (PET) or a time-of-flight (TOF) PET scanner, has a plurality of detectors (14), each of which includes a plurality of hygroscopic scintillation crystals (32) in a detector housing (50), and a plurality of Silicon photomultiplier (SiPM) sensors (34), each of which is coupled to a respective crystal (32). Each detector further includes a transparent layer (52) that couples each sensor to a respective scintillation crystal (32), the transparent layer being between 2 microns and 10 microns thick, and a sealant layer (51) that hermetically seals the sensors (34) and crystals (32) in the detector housing (50).

One advantage is that the hygroscopic crystal integrity is maintained.

Another advantage resides in providing a 1:1 ratio of sensors to scintillation crystals.

Still further advantages of the subject innovation will be appreciated by those of ordinary skill in the art upon reading and understand the following detailed description.

The innovation may take form in various components and arrangements of components, and in various steps and arrangements of steps. The drawings are only for purposes of illustrating various aspects and are not to be construed as limiting the invention.

Figure 1:
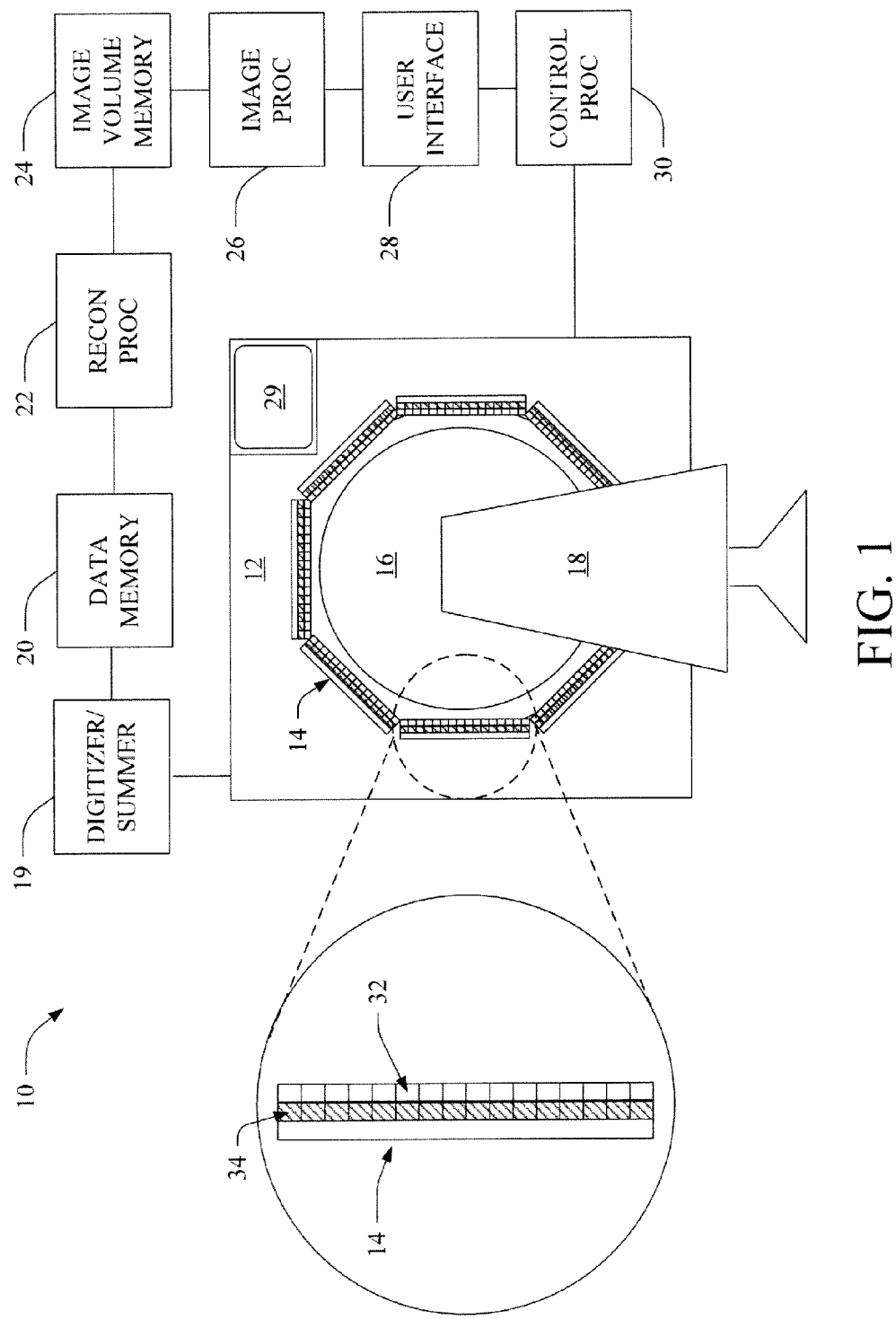
FIG. 1 illustrates a nuclear imaging system that includes a nuclear scanner having a plurality of nuclear detectors that surround an examination region into which a subject or patient is inserted on a patient support.

FIG. 1 illustrates a nuclear imaging system 10 that includes a nuclear scanner 12 having a plurality of nuclear detectors 14 that surround an examination region 16 into which a subject or patient is inserted on a patient support 18. In one embodiment the nuclear scanner is a time-of-flight positron emission tomography (TOF-PET) scanner and the nuclear detectors are PET detectors. In another embodiment, the nuclear scanner is a single-photon emission computed tomography (SPECT) scanner and the nuclear detectors are SPECT detectors.

Scan data is acquired during a nuclear scan of the subject. For each scintillation event received by a detector 14, its magnitude is digitized and a time stamp (e.g., when using PET and TOF-PET) is generated by a digitizer component 19, and then stored to a data memory 20 and reconstructed into a PET or other nuclear image by a reconstruction processor 22. In one embodiment, the acquired scan data is stored in list mode (e.g., time stamped, etc.) and scintillation events at detected at different detectors on opposite sides of a subject are analyzed (e.g., by a coincidence analyzer or the like) to determine whether they are from the same annihilation event (e.g., a photon or positron generation event in the subject). When a pair of corresponding scintillation events are identified, a ray tracing algorithm is executed to identify a line of response between the two scintillation events, and the point of origination of the positron is identified using time-of-flight information. The point of origination is then employed when reconstructing an image of the subject.

The reconstructed 3D image(s) is stored to an image volume memory 24, and processed by an image processor 26 for display on a user interface 28. Optionally, the image processor displays the image volume(s) on a display 29 on an associated workstation. The user interface permits a user to input information related to desired scan parameters, a desired image for presentation or viewing, etc., and/or to manipulate (e.g., zoom, rotate, etc.) a 3D image volume presented on the user interface 28 and/or the display 29.

The system further includes a control processor 30 that executes user-entered commands received from the user interface, such as instructions related to translation of the patient support into and out of the examination region of the scanner, instructions related to particular scan parameters (e.g., scan time, etc.), and the like. The control processor controls the scanner during data acquisition.

The nuclear detectors 14 each include a plurality of scintillation crystals 32, each of which is coupled to a respective sensor 34 that detects a photon event in its crystal. By providing a one-to-one sensor-to-crystal ratio, the described detectors enable greatly improved sampling relative to classical detectors.

Various types of scintillation crystals are contemplated for use in the detectors 14. The scintillation materials may be hygroscopic or non-hygroscopic. When employing hygroscopic scintillation materials, it is useful to hermetically seal the crystals into the detector body to prevent moisture from degrading the crystals. For instance, in one embodiment, the scintillation crystals are formed of Lanthanum Bromide (LaBr). In another embodiment, the crystals are formed of Sodium Iodide (NaI).

Figure 2:
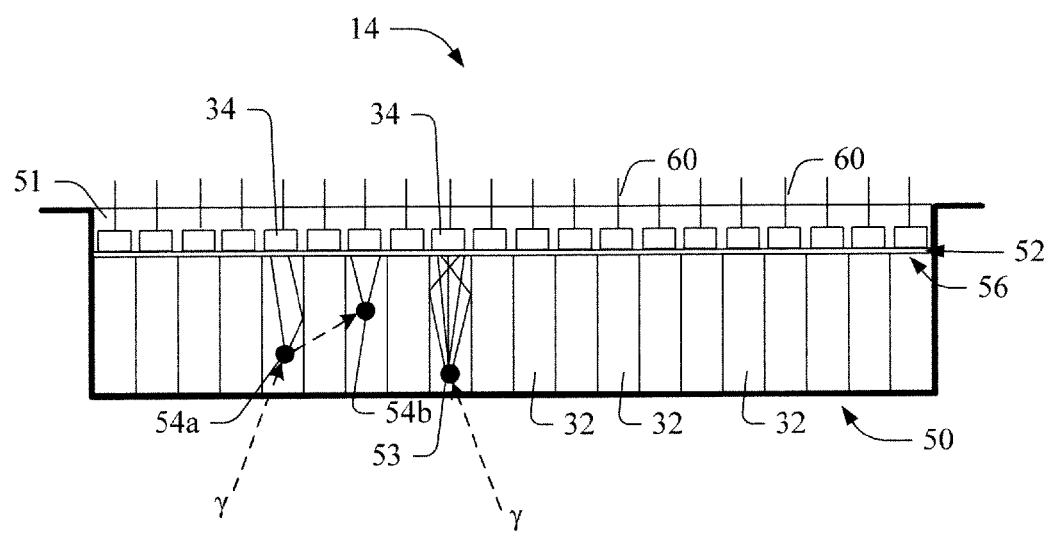
FIG. 2 illustrates an embodiment of the nuclear detector in which hygroscopic scintillation crystals (e.g., LaBr, NaI, and the like) are sealed inside a detector housing using a sealant layer.

FIG. 2 illustrates an embodiment of the nuclear detector 14 in which hygroscopic scintillation crystals 32 (e.g., LaBr, NaI, and the like) are sealed inside a detector housing 50 using a sealant layer 51 (e.g., a potting material, resin, gel, or some other suitable material), which also serves to make the nuclear detector air-tight and water-tight. Photons or positrons 53, 54a, 54b, entering a crystal 32 cause a scintillation event by which one or more gamma rays are converted to light rays emitted into the crystal and are internally reflected thereby until they are emitted out of a distal end 56 of the crystal(s). The light rays then traverse a thin coupling layer 52 and are detected by sensors 34 disposed on the opposite side of the coupling layer 52 relative to the crystals 32. The coupling layer may be approximately 2 microns to approximately 500 microns in thickness. In one embodiment, the sensors 34 are Silicon photomultipliers (SiPM), which facilitate construction of the one-to-one sensor-to-crystal ratio due to their small size. Based on the relative strength or intensity of the light rays and the time of detection at a given sensor, the crystal from which the scintillation event originated can be determined Once the identity (e.g., position or location) of the crystal on the detector 14 is known, the acquired scan data can be employed when reconstructing a nuclear image of the subject from which the photon or positron was emitted (e.g., using a nuclear tracer). In one embodiment, each crystal 32 is hermetically sealed with a thin, e.g. 2-500 micron coating that is reflective on all faces except the face coupled to the sensor 34, which face is covered with a transparent coating.

The light rays generated by photon 53 illustrate a photoelectric event in which the photon does not survive the impact with the crystal (e.g., the photon is completely converted to light rays. The light rays generated by the photon 54 illustrate a Compton interaction, wherein the photon at least partially survives the impact with the crystal (e.g., less than all of the photon is converted to light rays).

The arrow from photon 54a to photon 54b indicates that a single photon 54 causes two scintillation events and is detected by two different crystals 32. In such a scenario, the amount (magnitude) of light given off by the event 54a corresponds to the amount of energy absorbed by the crystal. The amount of energy left for the second event is a function of the Compton scattering angle. The first event typically absorbs the least energy. The first event 54a determines the trajectory of the detected gamma ray. The second event 54b may be usable to refine the gamma ray energy calculation if the second event can be paired to the first, e.g. based on relative times of interaction, proximity, Compton angle, relative energy, depth of interaction, etc. By determining the order of the scintillation events, the trajectory of the photon or positron can be determined (e.g., using a ray tracing technique, etc.), which identifies one of the events as the first-in-time of the related events.

According to another example, where a single photon causes three scintillation events, the lowest energy event is determined to be the first event, the next highest-energy event is determined to be the second event, and the highest energy event is determined to be the last event in time. The energies detected from the three events are equivalent to, for instance, the 511 keV use in PET imaging.

Additionally, the depth of interaction can be determined from the sharpness of the energy peak detected by a detector. For instance, a sharp peak indicates that the scintillation event occurred near the sensor, while a rounded peak indicates that the scintillation event occurred further away. Tracking the relative depth can also help identify related events and the connecting trajectory as well as whether a Compton scattered gamma ray is likely to have a second interaction within the array of scintillation crystals.

In another embodiment, small sensors 34 (e.g., SiPM sensors or the like) are directly coupled to a distal end 56 of their respective scintillation crystals 32, and hermetically sealed into the detector housing 50 by the sealant layer 51 (e.g., potting material, silica material, or the like). In one embodiment, the coupling layer 52 between the scintillator and the sensor is approximately 2 microns to 500 microns in thickness. When the crystals and sensors are built as a unitary solid state device, the coupling layer can be glass or sapphire. When photons enter respective crystals and produce a scintillation event, light rays are internally reflected with the crystal and are detected by the crystal's dedicated sensor precisely as they exit the crystal. By directly coupling the sensors 34 to respective crystals 32, light distribution is kept tight scatter is minimized In the illustrated example, rays from the respective photons have distinct signatures that permit optimal representation of photon interaction with the respective crystals.

In one embodiment, an electrical lead 60 is coupled to each sensor 34 to transmit information related to detected scintillation events therefrom. Each lead extends through the sealant layer 51.

In another embodiment, the leads 60 are collected into a common cable or bus or the like, and the cable traverses the sealant layer at one point to reduce the number of points at which the sealant layer is penetrated, which in turn mitigates potential for a breach of the hermetic seal. In this manner, the hygroscopic crystals are further protected from moisture.

Detected scintillation events are time-stamped and stored in list mode in a memory associated with the nuclear scanner, and analyzed to identify scintillation event pairs that correspond to a common annihilation event. For instance, scintillation events detected on opposite sides (e.g., 180° apart) of the subject can be analyzed to determine whether their time stamps indicate that they were detected close in time or concurrently and therefore correspond to a single annihilation event. Once identified, a line of response is calculated using the pair of corresponding scintillation events as endpoints, and an image of the subject is reconstructed.

It will be appreciated that although the sensors 34 of FIG. 2 are illustrated as having gaps therebetween, such gaps are present to show that the sensors are separated from each other and that each crystal has its own dedicated sensor. It will further be appreciated that each sensor's surface area closely matches the surface area of the distal end 56 of its respective crystal 32.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A nuclear detector for a nuclear imaging system, including;
   a hermetically sealable detector housing;
   a plurality of scintillation crystals positioned in the detector housing;
   a plurality of sensors, coupled to the scintillation crystals;
   a sealant layer that hermetically seals the scintillation crystals and sensors in the detector housing; and
   a lead extending from each sensor, wherein the leads are connected to a bus that extends through the sealant layer to transmit sensed information for processing.

2. The system according to claim 1, wherein the crystals are hygroscopic scintillation crystals.

3. The system according to claim 2, wherein the hygroscopic scintillation crystals are formed of one or more of Lanthanum Bromide (LaBr) and Sodium Iodide (NaI).

4. The system according to claim 2, wherein the sensors are Silicon photomultiplier (SiPM) sensors.

5. The system according to claim 1, further including a transparent coupling layer between each scintillation crystal and a corresponding sensor, the coupling layer being approximately 2-500 microns thick.

6. A nuclear scanner including at least one detector according to claim 1.

7. A method of constructing a nuclear detector for a nuclear scanner, including:
   positioning a plurality of scintillation crystals in a detector housing;
   coupling sensors (34) to the scintillation crystals;
   hermetically sealing the scintillation crystals and sensors in the detector housing using a sealant layer; and
   forming electrical leads from the sensors into a bus that traverses the sealant layer and over which sensed data is transmitted.

8. The method according to claim 7, wherein the scintillation crystals are hygroscopic scintillation crystals.

9. The system according to claim 8, wherein the hygroscopic scintillation crystals are formed of one or more of Lanthanum Bromide (LaBr) and Sodium Iodide (NaI).

10. The method according to claim 7, wherein the sensors are Silicon photomultiplier (SiPM) sensors.

11. The method according to claim 7, further including: reconstructing the data into a diagnostic image.

12. The method according to claim 7, wherein the sensors are coupled to the crystals in a 1:1 ratio such that each crystal is coupled to a dedicated sensor.

13. A method of generating a nuclear image of a subject using a plurality of nuclear detectors as set forth in claim 7, including:
    detecting a first scintillation event in a first scintillation crystal at a first sensor in a first nuclear detector; and
    detecting, at a second sensor in a second nuclear detector positioned opposite the first nuclear detector relative to the subject, a second scintillation event in a second scintillation crystal; and
    storing information associated with the first and second scintillation events in list mode.

14. The method according to claim 13, further including:
    determining whether the first and second scintillation events correspond to a single positron emission event as a function of time stamp information associated with the first and second scintillation events; and
    determining a line of response between the first and second scintillation events when reconstructing an image of the subject.

15. The method according to claim 13, further including:
    determining a depth of interaction of a positron interacting with the first scintillation crystal to cause the first scintillation event, based on a sharpness of an energy peak detected by the first sensor;
    detecting, at a third sensor, a third scintillation event that occurs in a third scintillation crystal, which is located in the first nuclear detector;
    storing information associated with the third scintillation event in list mode; and
    determining whether the first and third scintillation events are caused by a single positron emission event based on one or more of relative times of interaction of the first and third scintillation events, proximity of the first and third scintillation events, Compton angle between the first and third scintillation events, relative energy of the first and third scintillation events, and depth of interaction of the first and third scintillation events.

16. The method according to claim 15, further including:
    determining which of the first and third scintillation events has a lower detected energy level;
    identifying the scintillation event with the lower energy value as occurring first in time; and
    executing a ray-tracing algorithm using the identified first-in-time scintillation event and the second scintillation event detected by the second sensor in the second nuclear detector to determine a line of response between the first-in-time scintillation event and the second scintillation event.

17. A method of constructing a nuclear detector for a nuclear scanner, including:
    positioning a plurality of scintillation crystals in a detector housing;
    coupling sensors (34) to the scintillation crystals;
    hermetically sealing the scintillation crystals and sensors in the detector housing using a sealant layer; and
    forming a lead extending from each sensor through the sealant layer, wherein the leads transmits sensed information for processing.

18. The method according to claim 17, wherein the scintillation crystals are hygroscopic scintillation crystals.

19. The system according to claim 18, wherein the hygroscopic scintillation crystals are formed of one or more of Lanthanum Bromide (LaBr) and Sodium Iodide (NaI).

20. The method according to claim 17, wherein the sensors are Silicon photomultiplier (SiPM) sensors.

21. A positron emission tomography (PET) scanner having a plurality of detectors, each of which includes:

a plurality of hygroscopic scintillation crystals in a detector housing;
a plurality of Silicon photomultiplier (SiPM) sensors, each of which is coupled to a respective crystal;
a transparent layer that couples each sensor to a respective scintillation crystal, the transparent layer being between 2 microns and 10 microns thick;
a sealant layer that hermetically seals the sensors and crystals in the detector housing; and
a lead extending from each sensor, wherein the leads are connected to a bus that extends through the sealant layer to transmit sensed information for processing.

22. A nuclear detector for a nuclear imaging system, including;
a plurality of scintillation crystals positioned in a detector housing;
a plurality of sensors, coupled to the scintillation crystals; and
a sealant layer that seals the scintillation crystals and sensors in the detector housing;
wherein each sensor is coupled to a lead that extends through the sealant layer to transmit sensed information for processing.

23. The system according to claim 22, wherein the crystals are hygroscopic scintillation crystals.

24. The system according to claim 23, wherein the hygroscopic scintillation crystals are formed of one or more of Lanthanum Bromide (LaBr) and Sodium Iodide (NaI).

25. The system according to claim 23, wherein the sensors are Silicon photomultiplier (SiPM) sensors.

26. The system according to claim 22, further including a transparent coupling layer between each scintillation crystal and a corresponding sensor, the coupling layer being approximately 2-500 microns thick.

27. A nuclear scanner including at least one detector according to claim 22.

* * * * *